(12) United States Patent
Pervan

(10) Patent No.: US 11,781,323 B2
(45) Date of Patent: *Oct. 10, 2023

(54) PANEL FORMING

(71) Applicant: Ceraloc Innovation AB, Viken (SE)

(72) Inventor: Darko Pervan, Viken (SE)

(73) Assignee: CERALOC INNOVATION AB, Viken (SE)

(*) Notice: Subject to any disclaimer, the term of this patent is extended or adjusted under 35 U.S.C. 154(b) by 24 days.

This patent is subject to a terminal disclaimer.

(21) Appl. No.: 17/228,240

(22) Filed: Apr. 12, 2021

(65) Prior Publication Data

US 2021/0363760 A1 Nov. 25, 2021

Related U.S. Application Data

(63) Continuation of application No. 16/814,074, filed on Mar. 10, 2020, now Pat. No. 11,002,022, which is a
(Continued)

(51) Int. Cl.
E04F 15/00 (2006.01)
E04F 15/02 (2006.01)
(Continued)

(52) U.S. Cl.
CPC .......... *E04F 15/02038* (2013.01); *B27F 1/02* (2013.01); *B27N 3/04* (2013.01);
(Continued)

(58) Field of Classification Search
CPC .......... E04F 15/02033; E04F 15/02038; E04F 15/02161; E04F 15/041; E04F 2201/0161;
(Continued)

(56) References Cited

U.S. PATENT DOCUMENTS 2,004,917 A 6/1935 Johnson
2,031,596 A 2/1936 Fulbright
(Continued)

FOREIGN PATENT DOCUMENTS

CA 2 903 432 A1 1/2008
DE 2 251 762 A1 5/1974
(Continued)

OTHER PUBLICATIONS

U.S. Appl. No. 16/808,973, Per Josefsson and Richard Jolfson, filed Mar. 4, 2020 (Cited herein as US Patent Application Publication No. 2020/0282589 A1 of Sep. 10, 2020).
(Continued)

*Primary Examiner* — Chi Q Nguyen
(74) *Attorney, Agent, or Firm* — Boone IP Law, PLLC

(57) ABSTRACT

Building panels, especially laminated floor panels are shown, which are provided with a locking system and several core grooves at the rear side in order to save material and decrease weight. Building panels, each having a surface layer on a front side, a backing layer on a rear side and an intermediate core, wherein the intermediate core and the surface and the backing layer all comprise wood fibres and thermosetting resins, the building panels are provided with a locking system for vertical and horizontal locking of a first edge of a first building panel to an adjacent second edge of a second building panel.

19 Claims, 8 Drawing Sheets

Related U.S. Application Data continuation of application No. 15/809,582, filed on Nov. 10, 2017, now Pat. No. 10,619,356, which is a continuation of application No. 15/398,484, filed on Jan. 4, 2017, now Pat. No. 9,840,849, which is a continuation of application No. 15/164,523, filed on May 25, 2016, now Pat. No. 9,556,623, which is a continuation of application No. 15/085,535, filed on Mar. 30, 2016, now Pat. No. 9,482,015, which is a continuation of application No. 14/825,719, filed on Aug. 13, 2015, now Pat. No. 9,663,956, which is a continuation of application No. 13/932,406, filed on Jul. 1, 2013, now Pat. No. 9,140,010.

(60) Provisional application No. 61/667,190, filed on Jul. 2, 2012.

(51) Int. Cl.
| | |
|---|---|
| *E04C 2/24* | (2006.01) |
| *E04F 15/04* | (2006.01) |
| *E04F 15/10* | (2006.01) |
| *B27F 1/02* | (2006.01) |
| *B27N 3/04* | (2006.01) |
| *B32B 3/06* | (2006.01) |
| *B32B 21/02* | (2006.01) |
| *B41J 2/03* | (2006.01) |
| *B29B 13/02* | (2006.01) |
| *B27F 1/04* | (2006.01) |
| *B27F 1/00* | (2006.01) |

(52) U.S. Cl.
CPC ............. *B32B 3/06* (2013.01); *B32B 21/02* (2013.01); *E04C 2/246* (2013.01); *E04F 15/02161* (2013.01); *E04F 15/041* (2013.01); *E04F 15/102* (2013.01); *E04F 15/107* (2013.01); *B27F 1/00* (2013.01); *B27F 1/04* (2013.01); *B29B 13/02* (2013.01); *B32B 2471/00* (2013.01); *B32B 2607/00* (2013.01); *B41J 2/03* (2013.01); *E04F 2201/0161* (2013.01); *E04F 2201/023* (2013.01); *E04F 2203/04* (2013.01); *E04F 2203/08* (2013.01); *Y10T 428/24777* (2015.01)

(58) Field of Classification Search
CPC . E04F 2203/04; E04F 2203/08; E04F 15/107; E04F 15/102; E04F 2201/042; E04F 2201/0107; E04F 2201/03; E04F 2201/0552; E04F 2201/023; E04F 2201/0535; E04F 2201/0146; E04F 2201/043; E04F 2201/0547; E04F 2201/0153; E04F 2201/0138; B27F 1/02; B27F 1/00; B27F 1/04; B27N 3/04; B32B 3/06; B32B 21/02; B32B 2471/00; B32B 2607/00; B29B 13/02; B41J 2/03; E04C 2/246; Y10T 428/24777
USPC ...... 52/391, 392, 311.2, 585.1, 590.2, 591.1, 52/591.5, 592.1, 592.2, 591.2
See application file for complete search history.

(56) References Cited

U.S. PATENT DOCUMENTS

| | | | |
|---|---|---|---|
| 2,088,238 A | 7/1937 | Greenway | |
| 2,269,927 A | 1/1942 | Crooks | |
| 2,324,628 A | 7/1943 | Kähr | |
| 3,234,074 A | 2/1966 | Bryant | |
| 3,619,964 A | 11/1971 | Passaro et al. | |
| 3,908,053 A | 9/1975 | Hettich | |
| 5,103,614 A | 4/1992 | Kawaguchi et al. | |
| 5,109,898 A | 5/1992 | Schacht | |
| 5,190,799 A | 3/1993 | Elingson, III | |
| 5,208,086 A | 5/1993 | Owens | |
| 5,540,025 A | 7/1996 | Takehara et al. | |
| 5,879,781 A | 3/1999 | Mehta et al. | |
| 5,900,099 A | 5/1999 | Sweet et al. | |
| 6,156,402 A | 12/2000 | Smith | |
| 6,182,413 B1 | 2/2001 | Magnusson | |
| 6,455,127 B1 | 9/2002 | Valtanen | |
| 6,465,046 B1 | 10/2002 | Hansson et al. | |
| 6,558,070 B1 | 5/2003 | Valtanen | |
| 6,761,008 B2 | 7/2004 | Chen et al. | |
| 6,769,219 B2 | 8/2004 | Schwitte et al. | |
| 6,772,568 B2 | 8/2004 | Thiers et al. | |
| 6,895,881 B1 | 5/2005 | Whitaker | |
| 6,953,105 B2 | 10/2005 | Rust et al. | |
| 7,152,379 B2 | 12/2006 | Lin et al. | |
| 7,337,588 B1 | 3/2008 | Moebus | |
| 7,413,374 B2 | 8/2008 | Rogers et al. | |
| 7,918,062 B2 | 4/2011 | Chen | |
| 8,029,880 B2 | 10/2011 | Liu | |
| 8,082,717 B2 | 12/2011 | Dammers | |
| 8,166,718 B2 | 5/2012 | Liu | |
| 8,245,477 B2 | 8/2012 | Pervan | |
| 8,261,507 B2 | 9/2012 | Hahn et al. | |
| 8,375,674 B2 | 2/2013 | Braun et al. | |
| 8,381,488 B2 | 2/2013 | Pervan | |
| 8,397,456 B2* | 3/2013 | Ruhdorfer ............... | B32B 27/10 156/308.2 |
| 8,419,877 B2 | 4/2013 | Pervan et al. | |
| 8,484,924 B2 | 7/2013 | Braun | |
| 8,490,361 B2 | 7/2013 | Curry et al. | |
| 8,544,232 B2 | 10/2013 | Wybo et al. | |
| 8,720,151 B2 | 5/2014 | Pervan | |
| 8,784,587 B2 | 7/2014 | Lindgren et al. | |
| 8,828,175 B2 | 9/2014 | Roy | |
| 8,839,584 B2 | 9/2014 | Sokol | |
| 8,850,769 B2 | 10/2014 | Pervan | |
| 8,875,464 B2 | 11/2014 | Pervan et al. | |
| 8,935,899 B2 | 1/2015 | Bergelin et al. | |
| 9,140,010 B2 | 9/2015 | Pervan | |
| 9,194,135 B2 | 11/2015 | Pervan | |
| 9,222,267 B2 | 12/2015 | Bergelin et al. | |
| 9,249,582 B1* | 2/2016 | Anspach ................... | E04C 2/26 |
| 9,314,936 B2 | 4/2016 | Pervan | |
| 9,315,994 B2* | 4/2016 | Chen ........................ | B41J 3/407 |
| 9,482,015 B2 | 11/2016 | Pervan | |
| 9,556,623 B2 | 1/2017 | Pervan | |
| 9,663,956 B2 | 5/2017 | Pervan | |
| 9,714,515 B2 | 7/2017 | Pervan | |
| 9,758,966 B2 | 9/2017 | Bergelin et al. | |
| 9,758,972 B2 | 9/2017 | Pervan | |
| 9,840,849 B2 | 12/2017 | Pervan | |
| 10,066,400 B2 | 9/2018 | Pervan | |
| 10,619,356 B2 | 4/2020 | Pervan | |
| 10,669,724 B2 | 6/2020 | Pervan | |
| 11,002,022 B2* | 5/2021 | Pervan ................. | E04F 15/107 |
| 11,377,855 B2* | 7/2022 | Josefsson ................ | E04F 13/14 |
| 2002/0007608 A1 | 1/2002 | Pervan | |
| 2002/0007609 A1 | 1/2002 | Pervan | |
| 2002/0100231 A1 | 8/2002 | Miller | |
| 2002/0170258 A1 | 11/2002 | Schwitte et al. | |
| 2003/0009971 A1 | 1/2003 | Palmberg | |
| 2003/0037504 A1 | 2/2003 | Schwitte | |
| 2003/0101681 A1 | 6/2003 | Tychsen | |
| 2003/0233809 A1 | 12/2003 | Pervan | |
| 2004/0211143 A1 | 10/2004 | Hanning | |
| 2004/0211144 A1 | 10/2004 | Stanchfield | |
| 2004/0226243 A1 | 11/2004 | Lin et al. | |
| 2004/0255538 A1 | 12/2004 | Ruhdorfer | |
| 2005/0005558 A1 | 1/2005 | Bolduc | |
| 2005/0069674 A1 | 3/2005 | Chang | |
| 2005/0102937 A1 | 5/2005 | Pervan | |
| 2005/0108969 A1 | 5/2005 | Whitaker | |
| 2005/0138881 A1 | 6/2005 | Pervan | |
| 2005/0208255 A1 | 9/2005 | Pervan | |
| 2005/0268571 A1 | 12/2005 | Magnusson | |
| 2006/0179773 A1 | 8/2006 | Pervan | |

(56) References Cited

U.S. PATENT DOCUMENTS

| | | |
|---|---|---|
| 2006/0191226 A1 | 8/2006 | Kim et al. |
| 2006/0194015 A1 | 8/2006 | Sabater et al. |
| 2007/0006543 A1 | 1/2007 | Engström |
| 2007/0175148 A1 | 8/2007 | Bergelin et al. |
| 2007/0193180 A1 | 8/2007 | Plante |
| 2007/0292656 A1 | 12/2007 | Handojo |
| 2008/0005992 A1 | 1/2008 | Pervan |
| 2008/0008871 A1 | 1/2008 | Pervan |
| 2008/0010937 A1 | 1/2008 | Pervan |
| 2008/0092473 A1 | 4/2008 | Heyns |
| 2008/0110125 A1 | 5/2008 | Pervan |
| 2008/0184647 A1 | 8/2008 | Yau |
| 2009/0155612 A1 | 6/2009 | Pervan et al. |
| 2009/0183458 A1 | 7/2009 | Gibson et al. |
| 2009/0193748 A1 | 8/2009 | Boo et al. |
| 2009/0269522 A1 | 10/2009 | Liu |
| 2010/0088990 A1 | 4/2010 | Liu |
| 2010/0129611 A1 | 5/2010 | Sugimoto |
| 2011/0030303 A1 | 2/2011 | Pervan et al. |
| 2011/0247285 A1* | 10/2011 | Wybo ............... B29C 66/12423 264/211.13 |
| 2011/0308097 A1 | 12/2011 | Vollrath |
| 2012/0124932 A1 | 5/2012 | Schulte et al. |
| 2012/0266555 A1 | 10/2012 | Cappelle |
| 2012/0279158 A1 | 11/2012 | Konstanczak |
| 2012/0317915 A1* | 12/2012 | Koennecke ............ E04B 9/366 52/506.09 |
| 2013/0047536 A1 | 2/2013 | Pervan |
| 2013/0065072 A1 | 3/2013 | Pervan |
| 2013/0145707 A1 | 6/2013 | Pervan |
| 2013/0199120 A1 | 8/2013 | Bergelin et al. |
| 2013/0260089 A1 | 10/2013 | Gorby et al. |
| 2013/0273244 A1 | 10/2013 | Vetter et al. |
| 2013/0283720 A1 | 10/2013 | Pervan et al. |
| 2014/0000197 A1 | 1/2014 | Pervan |
| 2014/0215952 A1 | 8/2014 | Pervan |
| 2014/0283466 A1 | 9/2014 | Boo |
| 2015/0059927 A1 | 3/2015 | Brännström et al. |
| 2015/0090400 A1 | 4/2015 | Bergelin et al. |
| 2015/0113908 A1* | 4/2015 | Ramachandra ......... E04F 15/10 52/745.13 |
| 2015/0345153 A1 | 12/2015 | Pervan |
| 2016/0069089 A1 | 3/2016 | Bergelin |
| 2016/0168865 A1 | 6/2016 | Pervan |
| 2016/0194883 A1 | 7/2016 | Pervan |
| 2016/0208501 A1 | 7/2016 | Pervan |
| 2016/0250835 A1 | 9/2016 | Pervan |
| 2016/0265234 A1 | 9/2016 | Pervan |
| 2016/0265236 A1 | 9/2016 | Pervan |
| 2016/0034091 A1 | 11/2016 | Ramachandra |
| 2016/0369507 A1 | 12/2016 | Pervan et al. |
| 2017/0114550 A1 | 4/2017 | Pervan |
| 2017/0268238 A1 | 9/2017 | Pervan |
| 2018/0080232 A1 | 3/2018 | Pervan |
| 2018/0223540 A1 | 8/2018 | Cappelle |
| 2018/0313094 A1 | 11/2018 | Pervan |
| 2018/0355620 A1 | 12/2018 | Pervan |
| 2020/0208411 A1 | 7/2020 | Pervan |
| 2020/0282589 A1 | 9/2020 | Joseffson et al. |
| 2020/0308846 A1 | 10/2020 | Joseffson et al. |
| 2021/0032877 A1 | 2/2021 | Pervan |
| 2021/0198901 A1* | 7/2021 | Josefsson ................ B32B 3/263 |

FOREIGN PATENT DOCUMENTS

| | | |
|---|---|---|
| DE | 295 21 221 U1 | 3/1997 |
| DE | 100 49 172 A1 | 4/2002 |
| DE | 103 00 451 B3 | 1/2004 |
| DE | 10 2005 061 099 A1 | 3/2007 |
| DE | 10 2006 024 184 A1 | 11/2007 |
| DE | 10 2007 032 885 A1 | 1/2009 |
| EP | 2 206 851 A2 | 7/2010 |
| EP | 2 206 851 A3 | 7/2010 |
| EP | 2 339 092 A1 | 6/2011 |
| EP | 2 395 180 A2 | 12/2011 |
| EP | 2 520 737 A1 | 11/2012 |
| EP | 2 395 180 A3 | 1/2015 |
| EP | 3 415 702 A1 | 12/2018 |
| EP | 3 511 485 A1 | 7/2019 |
| ES | 2 350 339 A1 | 1/2011 |
| FI | 21805 | 1/1947 |
| GB | 519198 | 3/1940 |
| JP | S56-9114 A | 1/1981 |
| JP | S62-178654 A | 8/1987 |
| JP | H03-47366 A | 2/1991 |
| JP | H03-55444 U | 5/1991 |
| JP | H06-158831 A | 6/1994 |
| JP | H08-28015 A | 1/1996 |
| JP | H09-38906 A | 2/1997 |
| JP | H10-299231 A | 11/1998 |
| JP | H11-324292 A | 11/1999 |
| JP | 2000-265652 A | 9/2000 |
| JP | 2003-307023 A | 10/2003 |
| JP | 2004-225387 A | 8/2004 |
| JP | 2006-118337 A | 5/2006 |
| RU | 2359093 C2 | 6/2009 |
| WO | WO 96/06248 A1 | 2/1996 |
| WO | WO 99/00242 A1 | 1/1999 |
| WO | WO 01/48333 A1 | 7/2001 |
| WO | WO 03/087498 A1 | 10/2003 |
| WO | WO 2009/065769 A2 | 5/2009 |
| WO | WO 2009/065769 A3 | 5/2009 |
| WO | WO 2009/116926 A1 | 9/2009 |
| WO | WO 2010/081532 A1 | 7/2010 |
| WO | WO 2011/012104 A2 | 2/2011 |
| WO | WO 2011/012104 A3 | 2/2011 |

OTHER PUBLICATIONS

U.S. Appl. No. 16/826,761, Per Josefsson, Pontus Gamstedt and Per Nygren, filed Mar. 23, 2020 (Cited herein as US Patent Application Publication No. 2020/0308846 A1 of Oct. 1, 2020).

U.S. Appl. No. 16/854,343, Darko Pervan, filed Apr. 21, 2020 (Cited herein as US Patent Application Publication No. 2021/0032877 A1 of Feb. 4, 2021).

U.S. Appl. No. 17/130,783, Per Josefsson, Christoffer Nilsson, Filip Skőld, filed Dec 22, 2020 (Cited herein as US Patent Application Publication No. 2021/0198901 A1 of Jul. 1, 2021).

U.S. Appl. No. 17/463,902, Per Josefsson, Martin Bjeremyr, Richard Jolfson, filed Sep. 1, 2201.

International Search Report issued in PCT/SE2013/050837, dated Nov. 29, 2013, Patent-och registreringsverket, Stockholm, SE, 6 pages.

Extended European Search Report issued in EP 13813895.3, dated Apr. 29, 2016, European Patent Office, Munich, DE, 8 pages.

Extended European Search Report dated in EP 16171336.7, dated Oct. 4, 2016, European Patent Office, Munich, DE, 7 pages.

Extended European Search Report issued in EP 19155738.8, dated Jun. 14, 2019, European Patent Office, Munich, DE, 7 pages.

Pervan, Darko (Author)/Valinge Innovation, Technical Disclosure entitled "VA073a Zip Loc," Sep. 13, 2011, IP.com No. IPCOM000210869D, IP.com PriorArtDatabase, 36 pages (XP055191930).

Josefsson, Per, et al., U.S. Appl. No. 17/463,902 entitled "Method and Arrangement for Forming Grooves in a Board Element," filed Sep. 1, 2021.

* cited by examiner

KNOWN TECHNOLOGY

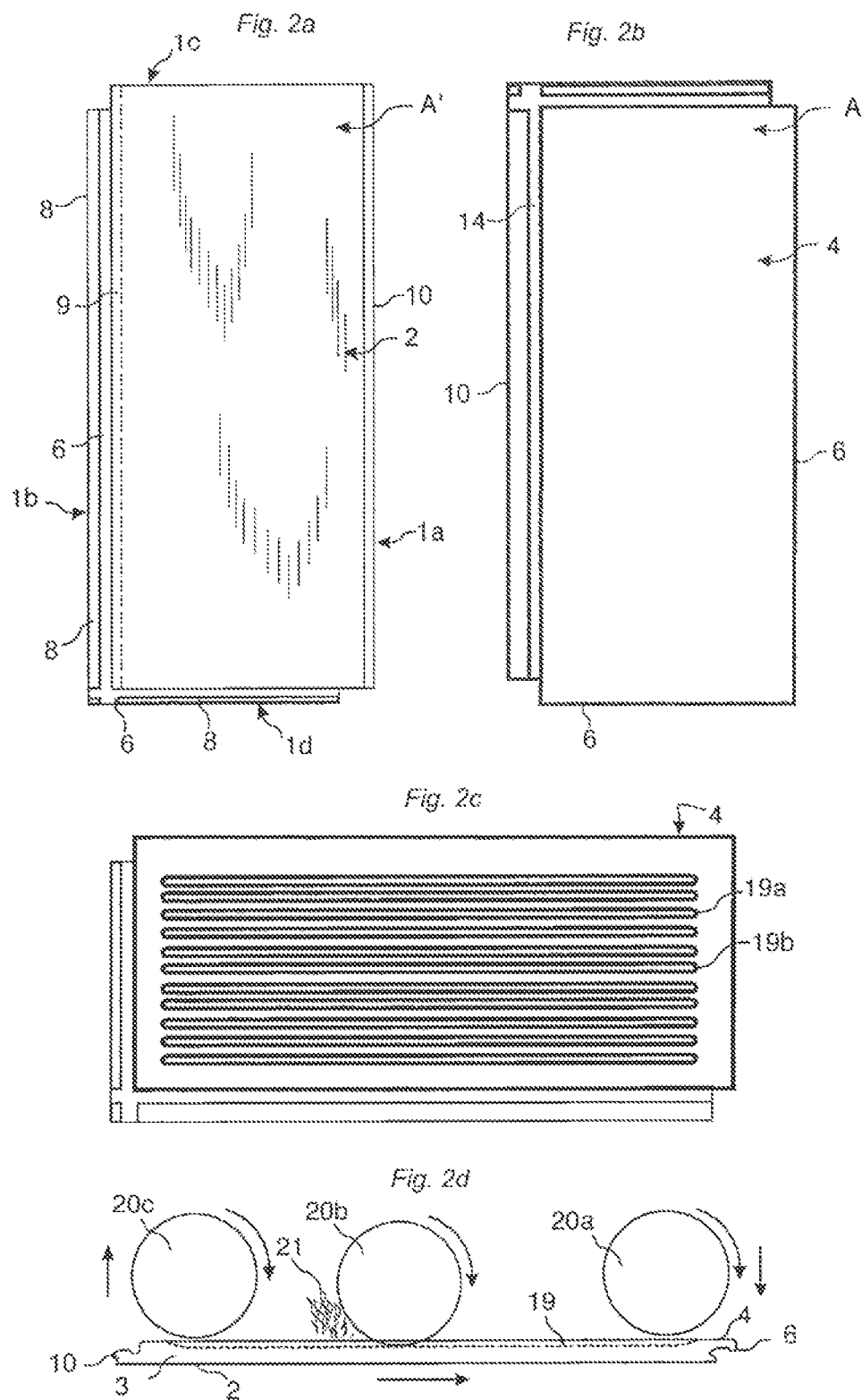

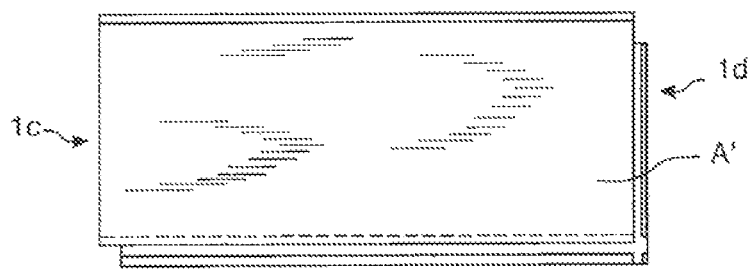
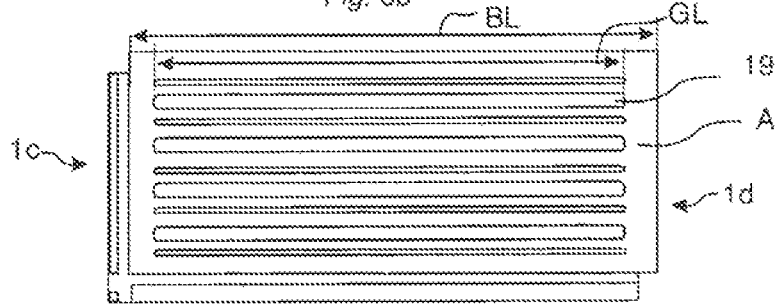
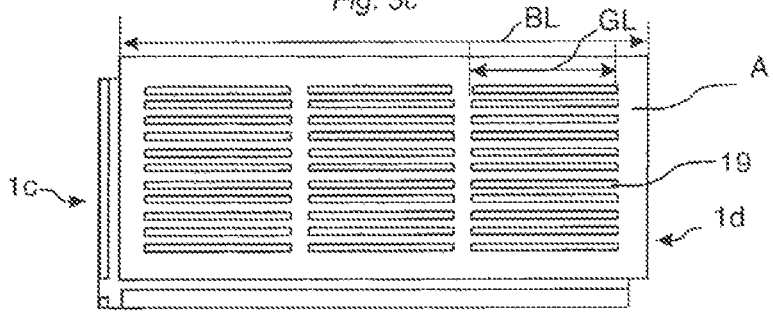
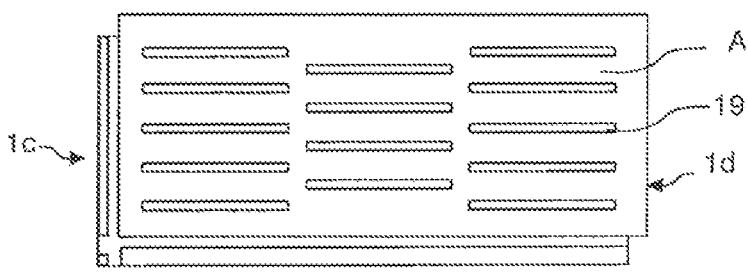
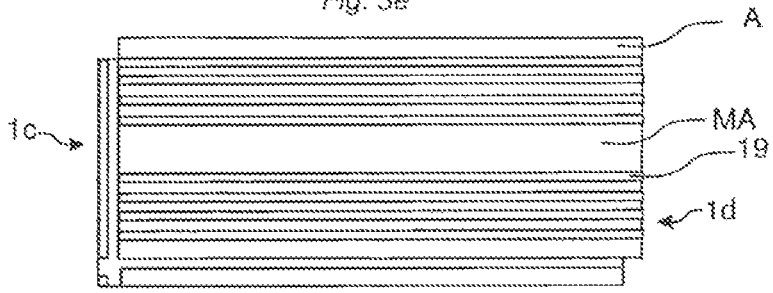

PANEL FORMING

CROSS REFERENCE TO RELATED APPLICATIONS

The present application is a continuation of U.S. application Ser. No. 16/814,074, filed on Mar. 10, 2020, now U.S. Pat. No. 11,002,022, which is a continuation of U.S. application Ser. No. 15/809,582, filed on Nov. 10, 2017, now U.S. Pat. No. 10,619,356, which is a continuation of U.S. application Ser. No. 15/398,484, filed on Jan. 4, 2017, now U.S. Pat. No. 9,840,849, which is a continuation of U.S. application Ser. No. 15/164,523, filed on May 25, 2016, now U.S. Pat. No. 9,556,623, which is a continuation of U.S. application Ser. No. 15/085,535, filed on Mar. 30, 2016, now U.S. Pat. No. 9,482,015, which is a continuation of U.S. application Ser. No. 14/825,719, filed on Aug. 13, 2015, now U.S. Pat. No. 9,663,956, which is a continuation of U.S. application Ser. No. 13/932,406, filed on Jul. 1, 2013, now U.S. Pat. No. 9,140,010, which claims priority to U.S. Provisional Application No. 61/667,190, filed on Jul. 2, 2012. The entire contents of each of U.S. application Ser. No. 16/814,074, U.S. application Ser. No. 15/809,582, U.S. application Ser. No. 15/398,484, U.S. application Ser. No. 15/164,523, U.S. application Ser. No. 15/085,535, U.S. application Ser. No. 14/825,719, U.S. application Ser. No. 13/932,406, and U.S. Provisional Application No. 61/667,190 are hereby incorporated herein by reference in their entirety.

TECHNICAL FIELD

The disclosure generally relates to the field of forming of panels, e.g. building panels. More particular, the disclosure relates to a method of forming floor panels and floor panels produced by the method.

FIELD OF APPLICATION

Embodiments of the present invention are particularly suitable for use in floating floors, which are formed of floorboards which are joined mechanically with a locking system and are made up of one or more upper layers of laminated decorative material, an intermediate core of wood-fibre-based material and a lower balancing layer on the rear side of the core. The following description of known technique, problems of known systems and objects and features of the disclosure will therefore, as a non-restrictive example, be aimed at this field of application and in particular at paper or powder based laminated floorings formed as rectangular floorboards intended to be mechanically joined on both long sides and short sides. However, it should be emphasized that embodiments of the invention may be used in all floor types which are installed with mechanical locking systems such as for example solid wood floors, LVT floors with a plastic surface layer and in wood based building panels, for instance in wall panels and furniture components

BACKGROUND OF THE INVENTION

Traditional laminated panels, intended to be used for, e.g. flooring or furniture components, are produced by the following steps as shown in FIGS. 1a-1d. A decorative paper 2b and a wear resistant transparent overlay paper 2a are impregnated with a thermosetting resin, such as melamine, and are applied on the upper part of a HDF core 3. A balancing paper 4 impregnated with a melamine resin, general called backing, is applied on the backside of a HDF core. The core 3 with the upper 2 and lower 4 layers is moved into a press 5 and pressed under heat and pressure such that the thermosetting resins are cured and the layers are attached to the core as shown in FIG. 1b.

Typical press parameters are 40 bar pressure and a temperature of 160-200 C.° with a pressing time of 12-30 seconds.

This production method and product produced by such methods are generally referred to as the DPL process and DPL products (Direct Pressure Laminate) The upper and lower surface layers have generally at thickness of 0.1-0.2 mm.

HDF (High density fibreboard) comprises wood fibre and a thermosetting resin that also is cured by heat and pressure to a board with a thickness of about 6-12 mm and a density of about 800 kg/m3.

The most common floor size is a rectangular panel of 1.3*0.2 m with a thickness of about 8 mm. The panels are packed and supplied in a packet that contains about 10 panels with a floor area of about 2 m2. The weight of each packet is about 16 kg.

Recently new floor panels with a wood powder based surface and backing have been developed. The paper is replaced with a powder backing 4 comprising wood fibres and melamine particles that is scattered on one side of a core 3 and a powder based surface layer 2 comprising wood fibres, thermosetting resins, preferably melamine particles, aluminum oxide particles and color pigments, is scattered on the other side of the core that generally is a HDF board. The scattering is made by rollers and brushes and very accurate layers of about 100-800 gr/m2 may be scattered with high precision on the HDF core material that generally has a thickness of about 7-10 mm. The surface 2, the core 3 and the backing 4 are pressed under heat and pressure in a continuous or discontinuous press 5 to obtain a product with a paper free and solid surface layer and backing.

The pressed powder based layers may have a thickness of about 0.2-1.0 mm. Typical press parameters are similar to conventional laminate flooring and may be a pressure of 40-80 bar and a temperature of 160-200 C.° with a pressing time of 10-40 seconds.

Such wood fibre based floors, generally referred to as WFF floors, have considerably better properties than traditional laminate floors since a thicker and more impact and wear resistant surface may be produced in a cost efficient way.

These two production methods may be combined.

A laminate floor with a paper based surface layer may have a powder based sub layer under the decorative paper in order to provide better impact resistance and deeper embossing. The paper backing may be replaced with a powder backing. The sub layer may be used to impregnate the decorative paper during pressing when the resins from the sub layer penetrate into the decorative paper.

WFF floor may also have several different layers on the upper side for example a high quality top layer 2a and a more cost efficient sub layer 2b under the top layer. The sub layer may comprise lower resin content and no aluminum oxide particles are needed.

A common feature for the paper or powder based surface layers, the paper or powder based backing layers and the HDF core is that all these materials comprise wood fibres and thermosetting binders, preferably melamine or urea, and that they are cured by heat and pressure. The wood fibres may be of the same type.

The layers are exposed to a first shrinking when the thermosetting resin in the upper and lower layer cures during pressing. The HDF core is also heated and becomes soft and easy to bend. The backing layer balances the tension that is created by the surface layer and the panel is substantially flat with a small convex backward bending when it leaves the press. The second temperature shrinking, when the panels is cooled from about 160-200° C. to room temperature, is also balanced by the backing layer and the panel 1 is essentially flat. A small convex backward bending is preferred since this counteracts upward bending of the edges in dry conditions when the relative humidity may go down to 20% or lower during wintertime.

This essentially flat pressed board comprises tension forces caused by the shrinking of the surface and balancing layers.

The board is generally cut and formed into several floor panels with locking systems on long and short edges as shown in FIG. 1c. The locking system comprises generally a tongue 10 and a tongue groove 9 for vertical locking and a strip 6 with a locking element 8 that cooperates with a locking groove 14 for horizontal locking.

The surface layer 2 has about the same length and width as the backing layer 4 as shown in FIG. 1d. The locking system may be formed in one piece with the core. Alternatively separate materials may be used to form for example the tongue 10 and/or the strip 6.

The prices for wood fibres and thermosetting resins are increasing and major increases are expected in the future due to shortage and the possibility to use wood fibres for energy production.

Several methods have been used to save material and to reduce costs. Such methods are mainly aiming to make thinner products that comprise a minimum of resins. Further cost savings are limited by minimum quality requirements related to the floor panel and the geometry of locking system.

It would be a major advantage if it would be possible to reduce the weight and material content. The problem with the present laminate and WFF floors is that they must have a high density core such as HDF that is needed for the stability, impact resistance and the strength which is needed to resist the heat and pressure from the pressing operation. Another problem is that the panels must have a minimum thickness and a core with high shear strength in order to allow the forming of a locking system with sufficient strength and geometry that allows easy installation.

It is known that grooves may be formed on the rear side of solid wood floors mainly in order to increase the flexibility of the panel. Such panels are easier to glue down to the sub floor. Grooves at the rear side of the panels are not used in laminate and WFF floors, which are installed with mechanical locking systems. The main reason is that such groove will have a negative impact on the stability of the panel and on the locking system since material will be removed from the balancing layer and the lower parts of the locking system.

Definition of Some Terms

In the following text, the visible surface of the installed floorboard is called "front side" or "surface", while the opposite side of the floorboard, facing the subfloor, is called "rear side". The starting board material that is used as a base material is called "core". When the core is coated with a surface layer closest to the front side and preferably also a balancing layer closest to the rear side, it forms a semi manufacture, which is called "a board" that in a subsequent operation generally is divided and machined into a plurality of "floor panels".

By "horizontal plane" is meant a plane, which extends parallel to the outer part of the surface layer. Immediately juxtaposed upper parts of two neighboring joint edges of two joined floorboards together define a "vertical plane" perpendicular to the horizontal plane.

The outer parts of the floorboard at the edge of the floorboard between the front side and the rear side are called "joint edge". As a rule, the joint edge has several "joint surfaces" which may be vertical, horizontal, angled, rounded, beveled etc.

By "locking system" is meant co-acting connecting means, which connect the floor panel vertically and/or horizontally. By "mechanical locking system" is meant that joining may take place without glue.

By "up or upward" means toward the surface and by "down or downward" means toward the rear side. By "inwardly" is meant towards the centre of the floorboard and by "outwardly" means in the opposite direction.

By "carving" is meant a method to form a groove or a protrusion on an edge of a panel by carving a part of the edge to its final shape by one or several carving tool configurations comprising several non-rotating and fixed chip-removing surfaces located along the feeding direction.

BRIEF DESCRIPTION OF EMBODIMENTS

An objective of embodiments of the present invention is to provide laminated panels comprising thermosetting resins and a method to produce such panels with the aim to reduce the weight and material content of such panels, especially floor panels, and to combine such cost saving and material reducing methods with a high quality locking systems and a core that provides sufficient stability which is needed in the pressing operation and when the floor is used. A further objective is to provide solid wood floors with reduced weight and material content and increased stability.

A first aspect of the invention is building panels having a surface layer on the front side, an intermediate core and a backing layer on the rear side of the core, wherein the core and the layers all comprise wood fibres and thermosetting resins. The panels are provided with a locking system for vertical and horizontal locking of a first edge of a first building panel to an adjacent second edge of a second building panel. The upper parts of the first and the second edge in a locked position together define a vertical plane perpendicular to a horizontal plane, which is parallel to the surface. Said locking system comprises a tongue and a tongue groove configured to cooperate for vertical locking, and a strip, which is provided with a locking element and configured to cooperate for horizontal locking with a downwardly open locking groove formed in an adjacent edge. The backing layer and the core comprise several vertically extending core grooves with an opening towards the rear side. The area of the backing layer is less than about 90% of the area of the surface layer.

The backing layer may comprise at least three core grooves spaced horizontally and inwardly from the locking system at one pair of opposite edges.

The area of the backing layer may be less than 80% of the area of the surface layer.

The entire parts of at least one core groove may be located inside the vertical plane VP at all edges.

The panels may be rectangular with long edges and short edges and the core grooves may be parallel with the long edges.

The core grooves may have a groove depth that is at least 0.3 times the floor thickness.

The core grooves may comprise an opening that is large than an inner part of the grooves.

The backing layer may comprise essentially the same fibres as the core.

A second aspect of the invention is a method to produce a floor panels each having a surface layer on the front side, an intermediate core and a backing layer on the rear side of the core wherein the core and the layers all comprise wood fibres and thermosetting resins. The method comprises the steps of:

creating wood fibre chips by forming core grooves in the rear side of previously produced panel;

producing a mix by mixing the wood chips with thermosetting resin, scattering the mix of wood chips and thermosetting resin on the upper and/or lower side of the core, forming a board by curing the mix with heat and pressure, cutting the board into several floor panels, and forming a locking system at a first and a second panel edge, the locking system comprises a strip, a locking element and a locking grove for horizontal locking and a tongue and a tongue groove for vertical locking.

The mix may be scattered on the lower side of the core.

The mix may be scattered on the upper and lower side of the core.

The core may be HDF.

The core grooves may be formed prior to the forming of the locking system on long or short edges.

The core grooves may be formed by a jumping tool comprising several rotating saw blades or a carving tool.

The pressed board may be more convex than the floor panel.

The core grooves are used to create wood fibre material that may be used in a second step to form the upper or lower layers of the floor panel. The material that is removed from the core when forming the core grooves, reduces the weight of the panel in spite of the fact that the original panel thickness is maintained and that a panel which is thicker than the original core may be formed by using the chips from the forming of the core grooves. The whole floor panel including the upper and lower layers may be formed by materials comprising the material from the core.

The core and the layers may, as an alternative, comprise a thermoplastic material, such as PVC, PET or vinyl, preferably provided with a filler, and the chips created are, for this alternative, embodiment plastic chips.

The locking system may, as an alternative, comprise a protruding strip at the first or the second panel edge and a recess on a lower side of the other of said first or second panel edge. An upper surface of the protruding strip or a lower surface of the recess is preferably provided with an adhesive, such as an adhesive tape, preferably provided with a removable strip.

A third aspect of the invention is a wood based floor panel having an upper and a lower layer of solid wood. The lower layer comprises cavities and the upper layer forms an upper part of the cavities.

The panels may have a mechanical locking system at two opposite edges.

A fourth aspect of the invention is a method to produce essentially flat floor panels, each having a surface layer on a front side, a backing layer on a rear side, and an intermediate core, wherein the surface and backing layer comprise thermosetting resins and wherein the method comprises the steps of:

forming a large board with convex pretension backwards by connecting the core, the surface layer and the backing layer with heat and pressure;

dividing the board into several floor panels;

forming core grooves at the rear side of the panels such that the convex pretension is at least partly released.

The core grooves may be formed after the dividing of the board into several floor panels.

The above objects are achieved wholly or partly by locking systems, floor panels and production methods according to embodiments of the invention.

BRIEF DESCRIPTION OF THE DRAWINGS

The present invention will by way of example be described in more detail with reference to the appended schematic drawings, which shows embodiments of the present invention.

FIGS. 2a-d illustrate a floor panel according an embodiment to the invention.

FIGS. 3a-e illustrate alternative embodiments of the invention.

DESCRIPTION OF EMBODIMENTS OF THE INVENTION

Figure 1A:
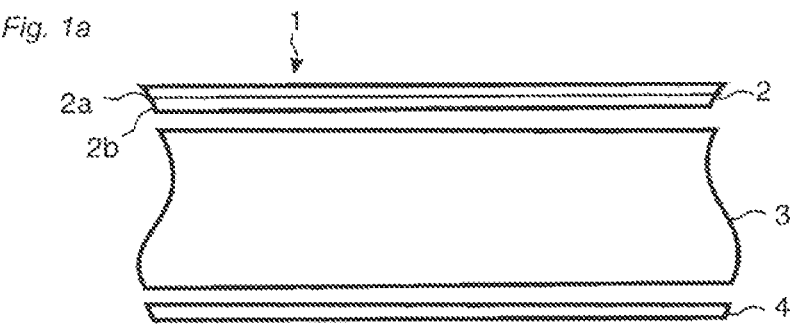
FIGS. 1a-d illustrate known technology.
Figure 1B:
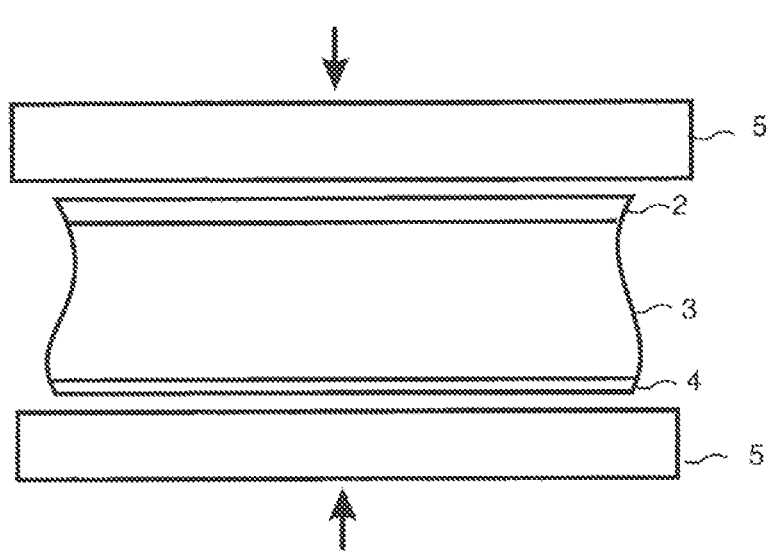
Figure 1C:
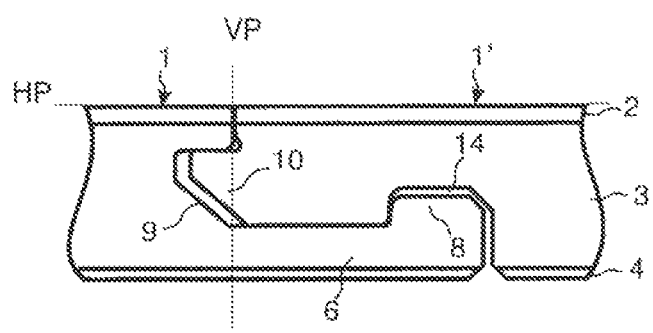
Figure 1D:
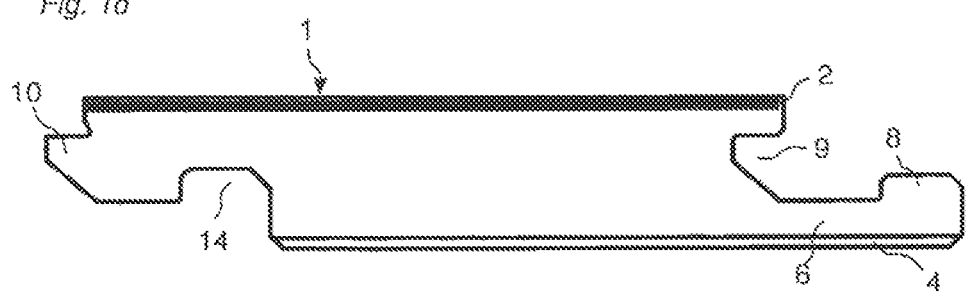

A first embodiment of floorboards provided with a mechanical locking system according to the invention is shown in FIGS. 2a-2d. The floor panel comprises a locking system on long 1a, 1b and short 1c, 1d edges. FIG. 2a shows the front side with the surface layer 2 and FIG. 2b shows the rear side with the backing layer 4. The area of the surface layer A' is essentially the same as the area A of the backing layer 4. FIG. 2c shows that essentially vertical core grooves 19a, 19b, with an opening toward the rear side or the panel, may be formed on the rear side in the backing layer 4 and into the core 3 that may be a wood based board such as for example HDF, chipboard or plywood. The core may also comprise plastic material. Such forming may be made with rotating saw blades 20a as shown in FIG. 2d. Carving may also be used. The panels are generally machined with the surface layer 2 pointing downwards. The jumping saw blade is displaced towards the panel 20a from above, or below if the surface layer 2 is pointing upwards, and away from the panel 20c when the panel moves relative the rotating saw blades. Several core grooves 19a, 19b are formed that in this preferred embodiment are located inwardly from the edges and preferably also inwardly from the vertical plane VP such that they do not intersect any part of the locking systems on the long and short edges. The grooves 19 may also be formed with fixed or jumping non-rotation carving tools.

The forming of the grooves creates wood chips 21 that according to embodiments of the invention may be milled and sieved to wood powder that may be mixed with thermosetting resin and scattered on a core to form the surface and/or backing layer. The core grooves are mainly used to provide wood fibre material that may be used in the upper 2 or lower 4 layers in order to save material. They may also be used to decrease the weight of the floor panel.

FIG. 3a-3e show that the core grooves 19 may be formed with many different geometries and patterns. The core grooves 19 may have different widths as shown in FIG. 3b and the groove length may be smaller than the length BL of the backing layer. They may be discontinuous as shown in FIGS. 3c and 3d and they may extend from one edge to the other edge as shown in FIG. 3e. The grooves may also be located mainly at the outer parts of the backing layer and there may be a middle area MA without any grooves. This may be used to increase the stability of the panel and to reduce the negative impact on the backing layer when parts of the backing layer are removed. The grooves may be formed along the long sides and/or along the short sides. The panels may also be square.

The core grooves reduces the area A of the backing layer. The area A of the backing layer is in the shown embodiments about 60%-85% of the area A' of the surface layer. This means that the balancing layer will lose 40-15% of its strength. A thicker backing layer or increased resin content may compensate such reduced backing area.

It is possible to form core grooves that reduce the backing area A with more than 50% compared to the initial area after pressing and the area A' of the surface layer.

Figure 4A:
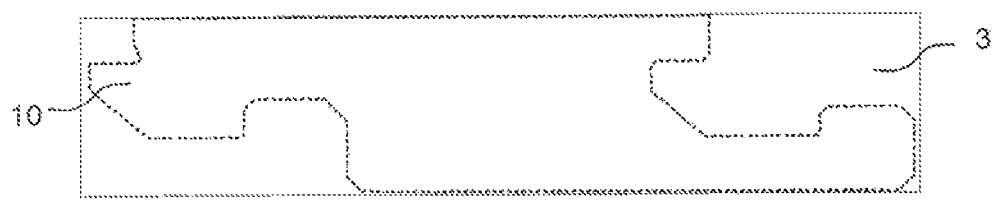
FIGS. 4a-d illustrate forming of a floor panel according to an embodiment of the invention.
Figure 4B:
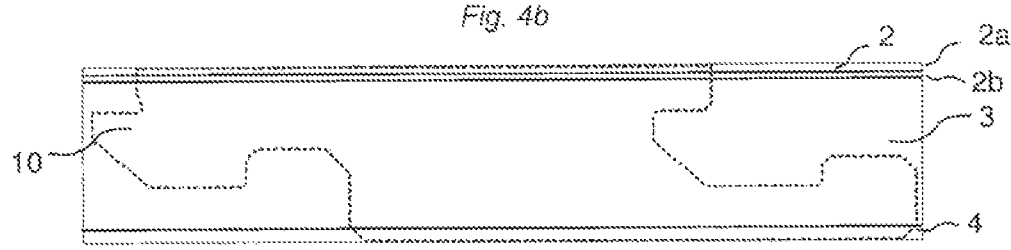
Figure 4C:
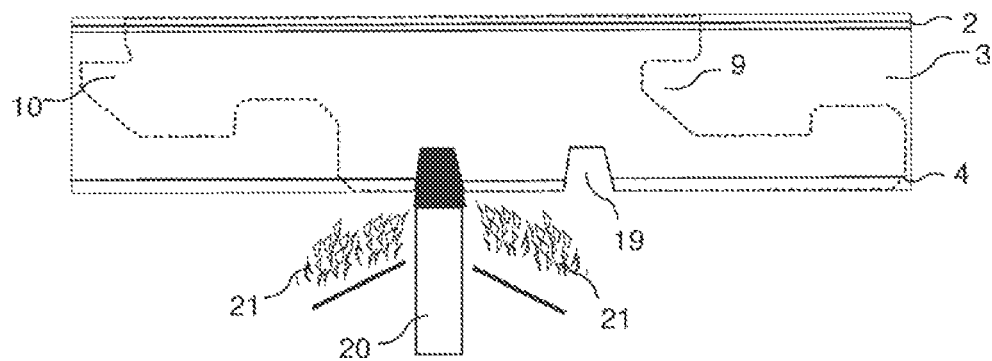
Figure 4D:
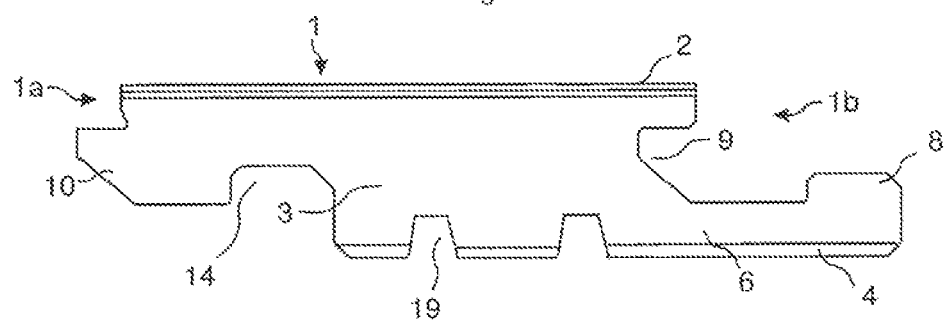

FIG. 4a-4d show forming of a floor panel 1 according to embodiments of the invention. A wood powder based sub layer 2b is applied on a core 3. FIG. 4b shows that a surface layer 2 comprising a top layer 2a of wood powder or a decorative paper and overlay may be applied on the sub layer 2b. A powder backing layer 4 may be applied on the rear side of the core 3. FIG. 4c shows the forming of a core groove 19 that creates chips 21. Such chips may be milled, sieved and mixed with thermosetting binders. This material may be scattered on the core to form the wood based top layer and/or sublayer and/or backing layer as shown in FIG. 4b. Finally the locking system 10, 9, 6, 8, 14 is formed as shown in FIG. 4d.

The milling or carving of the core grooves may be formed after pressing and prior to the sawing the large board into individual panels, after sawing but prior to the forming of the locking system, after the forming of the locking system on two opposite edges for example the long edges or as a final operation after the forming of the locking system. Such production steps may be combined and some grooves made be formed in several production steps.

The core grooves may easily provide sufficient wood fibre material for the various layers described above. The cured thermosetting resins from the chips are compatible with the melamine powder that is mixed into the wood powder and no separation of fibres and cured resins is needed. The backing and the surface may comprise new virgin thermosetting resins and already cured resins.

Figure 5A:
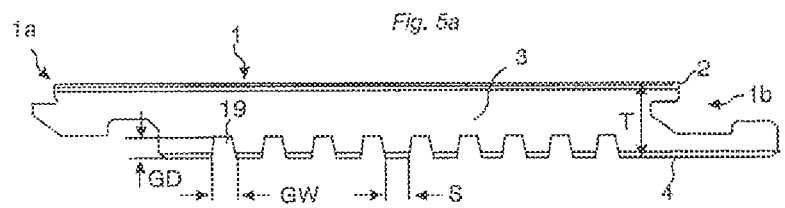
FIGS. 5a-e illustrate embodiments of core grooves.
Figure 5B:
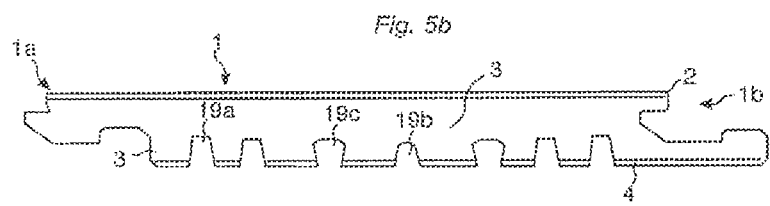

FIGS. 5a-e show different preferred geometries of the core grooves that may comprise a vertically extending groove depth GD of for example 0.1-0.5 times the floor thickness T, a groove width GW of about 0.5-1 times the floor thickness T and there may be a horizontally extending space S between the core grooves of about 0.2-1 times the floor thickness T as shown in FIG. 5a.

The core grooves may have different shapes and the inner core grooves 19b may be formed with a smaller groove depth GD than the outer grooves 19a in order to increase the stability of the panel. Core grooves 19c may also be formed with an undercut by for example a carving tool 20.

Core grooves with a groove depth GD of for example 0.8 times the panel thickness T may be formed in wall panels where the requirements on the impact resistance are much lower than in for floor panels.

Figure 5C:
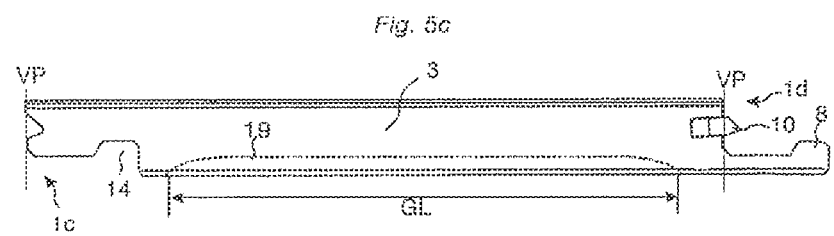
Figure 5D:
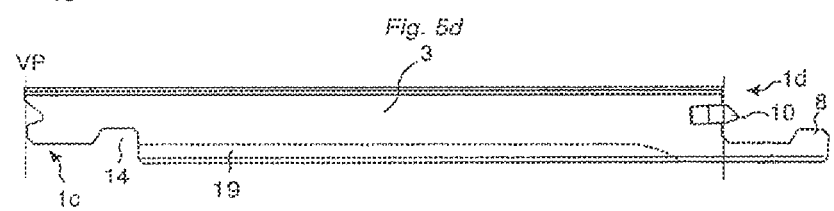
Figure 5E:
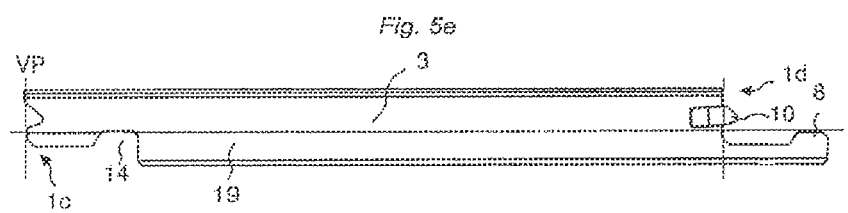

FIGS. 5c-5e show the core grooves 19 seen from the long edges. The panels have a fold down locking system on the short edges 1c,1d with a flexible tongue 10 that allows locking with vertical folding. FIG. 5c shows a core groove 19 with a groove length GL which is smaller than the distance between the locking systems at opposite short edges. FIG. 5d shows that the core grove 10 is curved at one short edge 1d and parallel with the surface at the other edge 1c such that it intersects a part of the locking groove 14. Such embodiments allows that the jumping tool have to be displaced during forming only when the forming of the core grooves 19 starts or ends. FIG. 5e shows a core groove 19 that is formed with a fixed tool and that intersects the locking strip 6 and the locking groove 14.

The core grooves may provide sufficient material to for example produce a 0.5 mm backing layer and a 0.5 mm sub layer. A 7 mm HDF core may be used to produce an 8 mm floor panel by using the material from the core to form the backing layer and preferably at least parts of the surface layers. This may result in a material saving and weight reduction of about 15%.

An even larger material saving and weight reduction of about 20% may be reached if core grooves are formed such that they reduce the backing layer with 50% of the floor surface and with a groove depth GD of 40% of the floor thickness T.

The core grooves may be filled with material that preferably is cheaper than wood and/or that gives the floor other properties such as for example an increased sound reduction.

The chips may of course also be used completely or partly to create thermal energy. Embodiments of the invention may therefore also be used in floors that comprise a wood based core and where the core groves are used for weight reduction and the chips for energy or as filler in various applications.

Forming of core groves after pressing provides the advantage that the backing layer counteracts the shrinking of the top layer during pressing and cooling and the pressed board is at this production stage not affected by the core grooves that are formed in the floor panel after the pressing operation.

However, the forming of the core grooves removes a part of the balancing layer and this may result in that tension is released and that the panel edges bend upward after the forming of the grooves. Such a panel will not be completely flat and may be slightly concave along the length and the width.

Figure 6A:
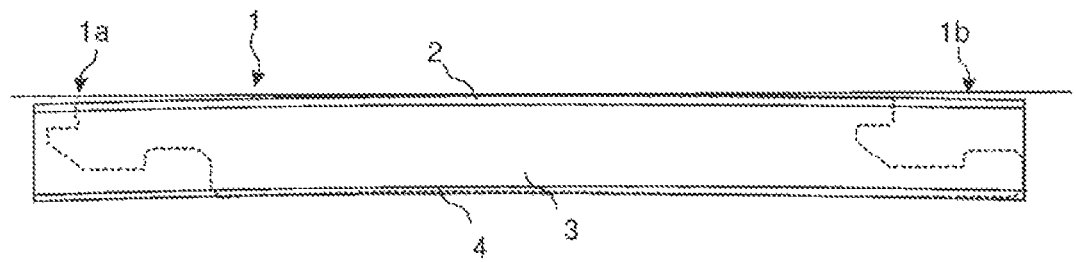
FIGS. 6a-e illustrate balancing of a panel with core grooves and core grooves in a solid wood floor according to embodiments of the invention.
Figure 6B:
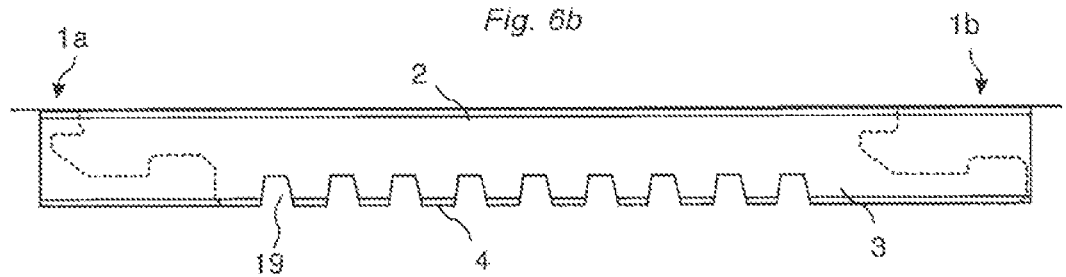
Figure 6C:
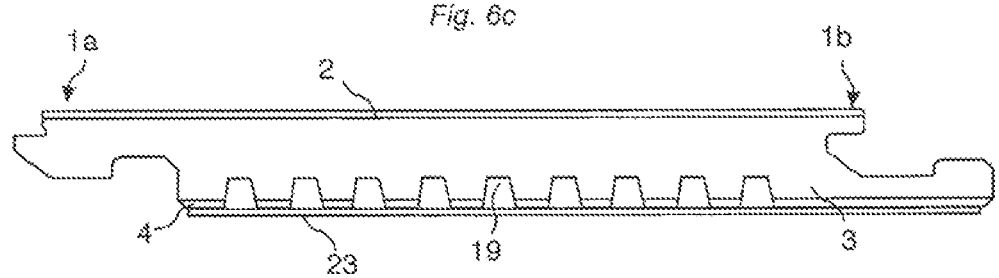

FIGS. 6a-6c show that such problems may be counteracted and completely eliminated if the large board is formed with a pre tension backwards that is adapted to the dimensional changes caused by the forming of the core grooves as shown in FIG. 6a. The pretension may be accomplished for example by a thicker backing layer that may comprise more resins and that may be cured at a higher temperature than the surface layer. Such a production method is characterized in that the board, when pressed and cooled, has a larger backwards bending than the final floor panel with core grooves on the rear side. Even a mechanical bending directly after the pressing when the board is still hot may be used to accomplish a plastic deformation and to stretch the surface layer such that an "over bending" backwards may be created that partly springs back to an essentially flat position when the core grooves 19 are formed. FIG. 6b shows that part of the tension is released when the core grooves are formed and the floor panel may be essentially flat when the grooves and the edges are formed as shown in FIG. 6c.

FIG. 6c shows that the core grooves may be covered with a separate covering layer 23 for example a paper, a plastic foil, foam, cork or a wood veneer. This may be used to hide the groves, to provide a moisture sealing or to reduce sound. The core grooves according to embodiments of the invention may therefore also be used in veneered floors where an upper and lower wood veneer is glued to a wood based core such as plywood, HDF or a chipboard.

Figure 6D:
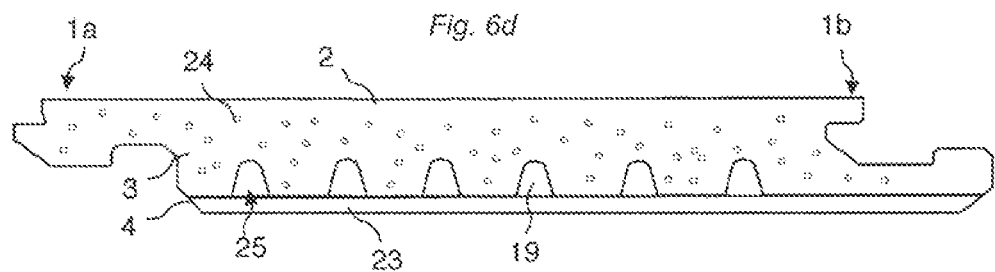

FIG. 6d shows that the method to form core grooves 19 may also be used in solid wood floors where core grooves 19 are formed in the solid wood body 3, preferably along the fibres 24 in the length direction of the panel. A wood veneer or a wood sheet may be used as a covering layer 23 to cover the opening 25 of the core grooves 19. Such wood based covering layer 23, that may have a thickness of for example 0.5-1.0 mm or more, may also provide stability and may counteract bending and warping. The moisture content of the veneer may be adapted to the moister content of the solid wood body such that a tension is obtained when the veneer or the wood sheet shrinks.

Figure 6E:
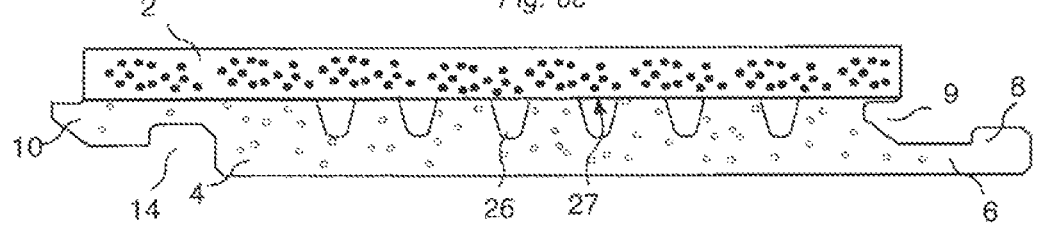

FIG. 6e shows a wood based floor panel having an upper 2 and a lower 4 layer of solid wood. The layer may be made of different wood types that are glued to each other. The lower layer 4 comprises cavities 26. The upper layer may form an upper part 27 of such cavities. The cavities may also be formed in the upper layer and the lower layer may form a lower part of such cavities.

The different wood types that are glued to each other may have about the same thickness. The locking system may be formed partly or completely in the lower layer 4. Core grooves 19 with an opening that points downwards may also be formed in the lower layer 4. The embodiment shown in FIG. 6e may comprise HDF boards, instead of the solid wood layers, that may be formed and glued together in the same manner as described above. Such a combination core may be laminated as a conventional solid HDF board. This method is particularly suitable to be used for thicker laminated panels of a thickness of about 8-12 mm.

Core grooves or cavities formed in solid wood provide the advantages that the weight of the solid wood floor may be reduced and increased stability may be obtained.

The chips from the core grooves or cavities may be used for thermal energy or to produce wood fibres for other powder based floors or fibre based boards such as particleboards. It is also possible to mix the wood chips with a binder and to produce an artificial wood veneer that may be handled as a separate layer and glued against the opening of the core grooves.

The same technology may be used in a floor with a plywood based core and a veneered surface layer.

Figure 7A:
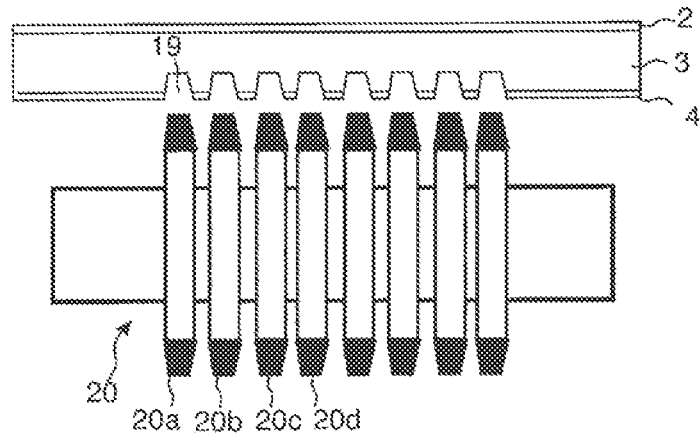
FIGS. 7a-c illustrate embodiments of tools to form core grooves.

FIG. 7a shows a tool 20 comprising several rotating saw blades that may be used to form core grooves 19.

Figure 7B:
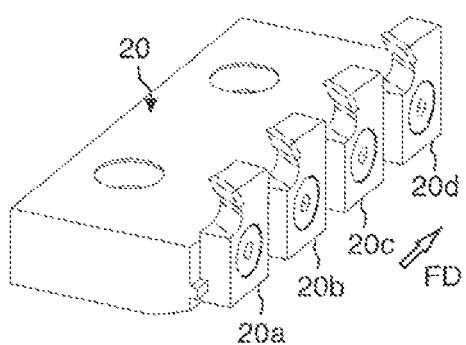
Figure 7C:
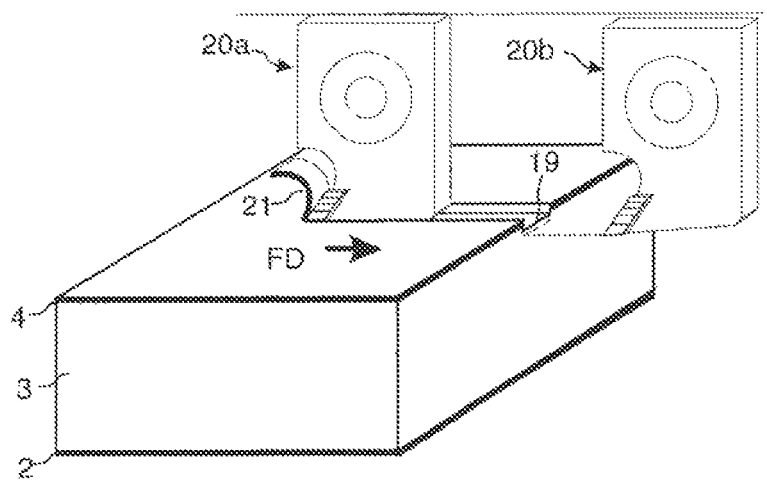

FIG. 7b shows a carving tool 20 with several carving teeth 20a-d that are offset horizontally. The carving tool is preferably fixed in the horizontal direction and the panel is displaced against the carving tool in the feeding direction FD against the tool. Each tooth may carve about 0.3-0.5 mm in HDF material. The groove may be V or U shaped or even undercut with an inner part that has a larger horizontal extension perpendicular to the groove length than the opening.

Figure 8A:
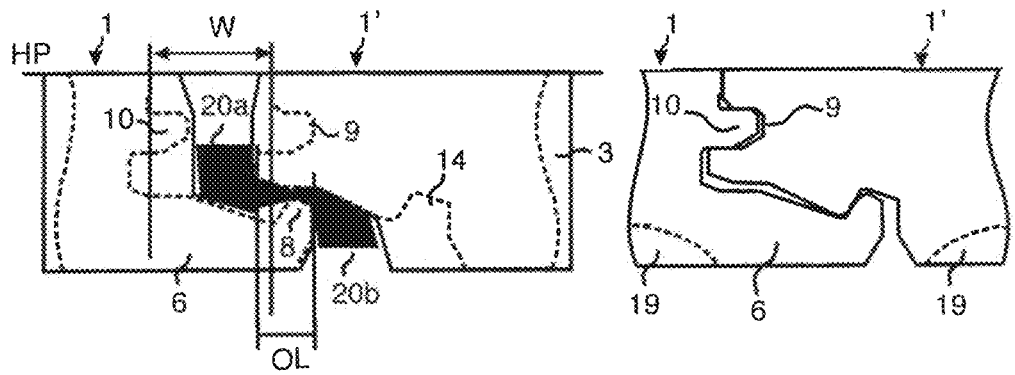
FIGS. 8a-c illustrate embodiments of cost efficient locking systems that may be combined with core grooves.
Figure 8B:
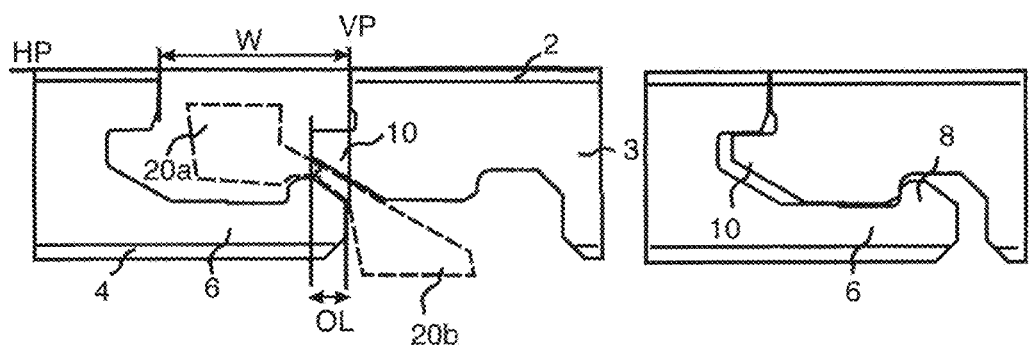
Figure 8C:
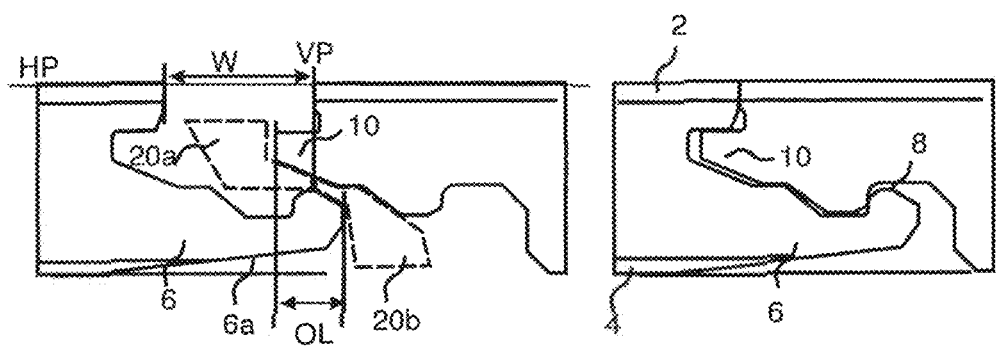

FIGS. 8a-8c show that further cost savings may be reached with locking systems that are adapted to be separated from the large board with overlapping edges OL and with a non-linear cut that preferably is made with carving tools 20a, 20b. FIG. 8a shows a locking system, which comprises a protruding tongue 10 and a protruding strip 6 on the same edge. Such joint geometry may be used to accomplish a considerable reduction of the material waste W that is caused when the panels are cut and when the locking systems are formed. FIG. 8c shows that the rear side 6a of the strip 6 may be formed such that the rear side of the strip is inclined upwards and such that an outer part of the strip is closer to the surface than an inner part. All such forming and material waste may be used to provide wood fibres that may be used in in upper or lower layers of a panel.

Core grooves may be combined with non-linear separation and locking systems that make it possible to divide the board into several panels that have geometry such that they may be positioned in the same horizontal plane HP with overlapping edges.

It is possible to form the whole floor panel from the wood material obtained from the core of other floor panels. Only melamine powder has to be added into the mix. The upper layer may be harder than the core since a higher density may be created during the pressing of the powder mix. Such panels may be formed with embossed structures and may be painted, lacquered or digitally printed in the factory or panted and/or lacquered after installation.

EMBODIMENTS

1. Building panels (1, 1'), each having a surface layer (2) on a front side, a backing layer (4) on a rear side and an intermediate core (3), wherein the intermediate core and the surface and the backing layer all comprise wood fibres and thermosetting resins, said building panels are provided with a locking system for vertical and horizontal locking of a first edge of a first building panel (1) to an adjacent second edge of a second building panel (1'), wherein upper parts of the first and the second edge in a locked position together define a vertical plane (VP) perpendicular to a horizontal plane (HP), which is parallel to the surface layer (2), said locking system comprises a tongue (10) and a tongue groove (9) configured to cooperate for vertical locking, and at the first edge a strip (6) provided with a locking element (8), which is configured to cooperate for horizontal locking with a downwardly open locking groove (14) formed in the second edge, characterized in that the backing layer (4) and the intermediate core (3) comprise several vertically extending core grooves (19) with an opening towards the rear side and that the area (A) of the backing layer is less than about 90% of the area A' of the surface layer.

2. The building panels as in embodiment 1, wherein the backing layer (4) comprises at least three core grooves (19) spaced horizontally and inwardly from the locking system at one pair of opposite edges.

3. The building panels as in embodiments 1 or 2, wherein the area (A) of the backing layer is less than 80% of the area of the surface layer (A').

4. The building panels as in any one of the embodiments 1-3, wherein the entire parts of at least one core groove (19) is arranged inside the vertical plane VP at all edges.

5. The building panels as in any one of the preceding embodiments, wherein the building panels are rectangular with long edges (1a, 1b) and short edges (1c, 1d) and wherein the core grooves (19) are essentially parallel with the long edges.

6. The building panels as in any one of the preceding embodiments, wherein the core groove depth (GD) is at least 0.3 times the floor thickness (T).

7. The building panels as in any one of the preceding embodiments, wherein the core grooves (19) comprises an opening with a groove width (GW) that is larger than an inner part of said groove.

8. The building panels as in any one of the preceding embodiments, wherein the backing layer (4) comprises essentially the same types of fibres as the core (3).

9. A method to produce floor panels, each having a surface layer (2) on a front side, a backing layer (4) on a rear side and an intermediate core (3), wherein the core and the surface and backing layer all comprise wood fibres and thermosetting resins and wherein the method comprises the steps of:
   creating wood fibre chips (21) by forming core grooves (19) in a rear side of previously produced panel;
   producing a mix by mixing the wood fibre chips with a thermosetting resin;
   scattering the mix on the upper and/or lower side of a core;
   forming the core and the mix to a board by curing the mix with heat and pressure;
   cutting the board into several floor panels; and
   forming a locking system at a first and a second edge of the floor panels, the locking system comprises a locking groove (14) and a strip (6) with a locking element (8) for horizontal locking and a tongue (10) and a tongue groove (9) for vertical locking.

10. The method as in embodiment 9 wherein the mix is scattered on the lower side of the core.

11. The method as in embodiment 9 or 10, wherein the mix is scattered on the upper and lower side of the core (3).

12. The method as in any one of the embodiments 9-11, wherein the core is HDF.

13. The method as in any one of the embodiments 9-12, wherein the core grooves are formed prior to the forming of the locking system at long or short edges of the floor panels.

14. The method as in any one of the embodiments 9-13, wherein the core grooves are formed by a jumping tool comprising several rotating saw blades or a carving tool.

15. The method as in any one of the embodiments 9-14, wherein the pressed board is more convex than the floor panels.

16. A wood based floor panel having an upper (2) and a lower (4) layer of solid wood, wherein the lower layer comprises cavities (26) and that the upper layer (2) forms an upper part (27) of the cavities (26).

17. The floor panel as in embodiment 16, wherein one pair of opposite panel edges comprises a mechanical locking system (9,10,6,8,14) for locking the floor panel to an adjacent essentially identical floor panel vertically and horizontally.

18. A method to produce essentially flat floor panels, each having a surface layer (2) on a front side, a backing layer (4) on a rear side and an intermediate core (3), wherein the surface and backing layer comprise thermosetting resins and wherein the method comprises the steps of:
   forming a large board with convex pretension backwards by connecting the core, the surface layer and the backing layer with heat and pressure
   dividing the board into several floor panels;
   forming core grooves (19) at the rear side of the panels such that the convex pretension is at least partly released.

19. The method as in embodiment 18, wherein the core grooves are formed after the dividing of the board into several floor panels.

20. The method as in embodiments 18 or 19, wherein the core grooves are formed after the dividing of the board into several floor panels.

The invention claimed is:

1. Building panels, each building panel having a surface layer and an intermediate core,
   wherein the intermediate core and the surface layer comprise a thermoplastic material,
   said building panels being provided with at least one of a vertical locking system and a horizontal locking system for locking a first edge of a first building panel to an adjacent second edge of a second building panel,
   wherein at least two core grooves are provided in a rear side of the building panels with an opening towards the rear side,
   wherein the core grooves extend to at least one edge of the building panels, and
   wherein a core groove depth is at least 0.3 times a thickness of the building panels.

2. The building panels as claimed in claim 1, wherein said at least one edge is at least one of the first edge and the second edge.

3. The building panels as claimed in claim 1, wherein the core grooves extend from one edge to another opposing edge of the building panel.

4. The building panels as claimed in claim 1, wherein said at least one edge corresponds to at least one short edge.

5. The building panels as claimed in claim 1, wherein a groove length of the core grooves is at least one of smaller than a length of the rear side and/or smaller than a distance between locking systems arranged at opposite edges.

6. The building panels as claimed in claim 5, wherein the length of the rear side is a longitudinal length of the rear side and wherein said opposite edges are opposite short edges.

7. The building panels as claimed in claim 5, wherein the core grooves are curved at one short edge and parallel with a surface at the other opposing short edge.

8. The building panels as claimed in claim 1, wherein the core grooves intersect a locking strip provided in the first edge, wherein the locking strip comprises a locking element configured to cooperate with a downwardly open locking groove provided in the second edge for horizontal locking.

9. The building panels as claimed in claim 1, wherein the core grooves at least partly intersect a downwardly open locking groove provided in a second edge of the first building panel, wherein the locking groove is configured to cooperate with a locking element provided in a locking strip of an adjacent first edge of a third building panel for horizontal locking.

10. The building panels as claimed in claim 1, wherein the core grooves are provided in the intermediate core.

11. The building panels as claimed in claim 1, wherein each building panel further comprises a backing layer and wherein the core grooves are provided in the backing layer.

12. The building panels as claimed in claim 1, wherein an area of the rear side is less than about 90% of an area of the surface layer.

13. The building panels as claimed in claim 1, wherein the intermediate core comprises a filler.

14. The building panels as claimed in claim 1, wherein at least one of the vertical and the horizontal locking system is a mechanical locking system.

15. The building panels as claimed in claim 1, wherein the vertical locking system comprises a tongue and a tongue groove.

16. The building panels as claimed in claim 1, wherein the building panels are rectangular with long edges and short edges and wherein the core grooves are essentially parallel with the long edges.

17. The building panels as claimed in claim 1, wherein the building panels are floor panels.

18. The building panels as claimed in claim 1, wherein the at least two core grooves comprise at least one inner core groove and at least one outer core groove, and wherein an inner core groove depth is smaller than an outer core groove depth.

19. Building panels, each building panel having a surface layer and an intermediate core,
- wherein the intermediate core and the surface layer comprise a thermoplastic material,
- said building panels being provided with a vertical locking system and/or a horizontal locking system for locking a first edge of a first building panel to an adjacent second edge of a second building panel,
- wherein at least two core grooves are provided in a rear side of the building panels with an opening towards the rear side,
- wherein the core grooves extend to at least one edge of the building panels, and
- wherein the building panels have a fold down locking system on the short edges with a flexible tongue configured to allow locking with vertical folding.

* * * * *